United States Patent
Kenney (10) Patent No.: US 11,823,713 B1
(45) Date of Patent: Nov. 21, 2023

(54) SYSTEM AND METHOD FOR EDITING AN AUDIO STREAM

(71) Applicant: Bolt-On IP Solutions, LLC, Boynton Beach, FL (US)

(72) Inventor: William Craig Kenney, Ellenton, FL (US)

(73) Assignee: BOLT-ON IP SOLUTIONS, LLC, Boynton Beach, FL (US)

( * ) Notice: Subject to any disclaimer, the term of this patent is extended or adjusted under 35 U.S.C. 154(b) by 0 days.

(21) Appl. No.: 17/937,545

(22) Filed: Oct. 3, 2022

(51) Int. Cl.
  *G11B 27/031* (2006.01)
  *G11B 11/105* (2006.01)
  *G11B 27/029* (2006.01)

(52) U.S. Cl.
  CPC ...... *G11B 27/031* (2013.01); *G11B 11/10526* (2013.01); *G11B 27/029* (2013.01)

(58) Field of Classification Search
  CPC .................................................. G11B 27/031
  See application file for complete search history.

(56) References Cited

U.S. PATENT DOCUMENTS

| | | | |
|---|---|---|---|
| 6,366,296 B1 * | 4/2002 | Boreczky | G06F 16/7847 715/721 |
| 6,885,987 B2 | 4/2005 | Buchholz et al. | |
| 8,615,153 B2 * | 12/2013 | Wu | G11B 27/22 386/200 |
| 8,961,183 B2 | 2/2015 | Bates et al. | |
| 8,995,815 B2 | 3/2015 | Maharajh et al. | |
| 10,878,835 B1 * | 12/2020 | Pedruzzi | G10L 15/02 |
| 2015/0309673 A1 * | 10/2015 | Brandley | G06F 16/168 715/716 |
| 2015/0332732 A1 * | 11/2015 | Gilson | G11B 27/005 386/240 |
| 2017/0229146 A1 * | 8/2017 | Garak | G06F 3/04845 |
| 2018/0308524 A1 * | 10/2018 | Muyal | G11B 27/34 |
| 2020/0042552 A1 * | 2/2020 | Mayes | G06F 16/7844 |
| 2020/0286484 A1 * | 9/2020 | Scanlon | G06F 3/012 |
| 2021/0192332 A1 * | 6/2021 | Gangotri | G06N 3/045 |
| 2021/0272599 A1 * | 9/2021 | Patterson | G11B 27/031 |
| 2021/0280206 A1 * | 9/2021 | Boothalingam | G10L 15/26 |
| 2021/0361227 A1 * | 11/2021 | Chou | A61B 5/7264 |
| 2022/0059077 A1 * | 2/2022 | Thomson | G10L 25/51 |
| 2022/0092109 A1 * | 3/2022 | Li | G06F 16/683 |

FOREIGN PATENT DOCUMENTS

CN 107393569 B 11/2017

* cited by examiner

*Primary Examiner* — Gelek W Topgyal
(74) *Attorney, Agent, or Firm* — Sagacity Legal, PLLC (57) ABSTRACT

A method for editing an audio stream includes recording and storing an audio stream having a first audio segment and a second audio segment. The method includes receiving a request to edit the second audio segment and processing the audio stream to identify a first pause segment defining a period of silence from an end of the first audio segment to a start of the second audio segment. Further, the method includes determining the second audio segment as a segment beginning at an end of the first pause segment and terminating either at an end of the audio stream or at a beginning of a second pause segment recorded in succession to the second audio segment, obtaining a third audio segment including a revised version of the second audio segment, and replacing the second audio segment with the third audio segment.

20 Claims, 10 Drawing Sheets

SYSTEM AND METHOD FOR EDITING AN AUDIO STREAM

BACKGROUND OF THE INVENTION

As digital audio products and services grow in popularity, there is an increasing demand for audio recording and editing tools. Many a time, one or more sections of recorded audio are required to be re-recorded, for example, to update a narrated content, correct an error in a narrated content, or remove unpleasant noises in the recorded audio. Re-recording a section of audio, however, is a tedious task, and, more often than not, requires the entire audio to be redone. A variety of audio editing tools are currently known for recording and editing audio. However, recording and editing audio by use of such products are complex and time-consuming, limiting their appropriateness or usability.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In one aspect, a method for editing an audio stream is described. The method includes recording, by a recorder, an audio stream having a first audio segment and a second audio segment and storing, by a processor, the audio stream in a memory. The second audio segment is recorded in succession to the first audio segment. The method further includes receiving, by the processor, a request to edit the second audio segment of the audio stream and processing, by the processor, the audio stream to identify a first pause segment defining a period of silence from an end of the first audio segment of the audio stream to a start of the second audio segment of the audio stream. Further, the method includes determining, by the processor, the second audio segment as a segment within the audio stream beginning at an end of the first pause segment and terminating either at an end of the audio stream or at a beginning of a second pause segment recorded in succession to the second audio segment, obtaining, by the processor, a third audio segment including a revised version of the second audio segment, and replacing, by the processor, the second audio segment with the third audio segment.

In another aspect, a system for editing an audio stream is described. The system includes a recorder, a memory, and a processor communicatively coupled to the recorder and the memory. The recorder is configured to record an audio stream having a first audio segment and a second audio segment. The second audio segment is recorded in succession to the first audio segment. The memory is configured to store the audio stream. The memory stores instructions executable by the processor, and wherein upon execution of the stored instructions the processor is configured to receive a request to edit the second audio segment of the audio stream and process the audio stream to identify a first pause segment defining a period of silence from an end of the first audio segment of the audio stream to a start of the second audio segment of the audio stream. The processor is further configured to determine the second audio segment as a segment within the audio stream beginning at an end of the first pause segment and terminating either at an end of the audio stream or at a beginning of a second pause segment recorded in succession to the second audio segment, obtain a third audio segment including a revised version of the second audio segment, and replace the second audio segment with the third audio segment.

Figure 1:
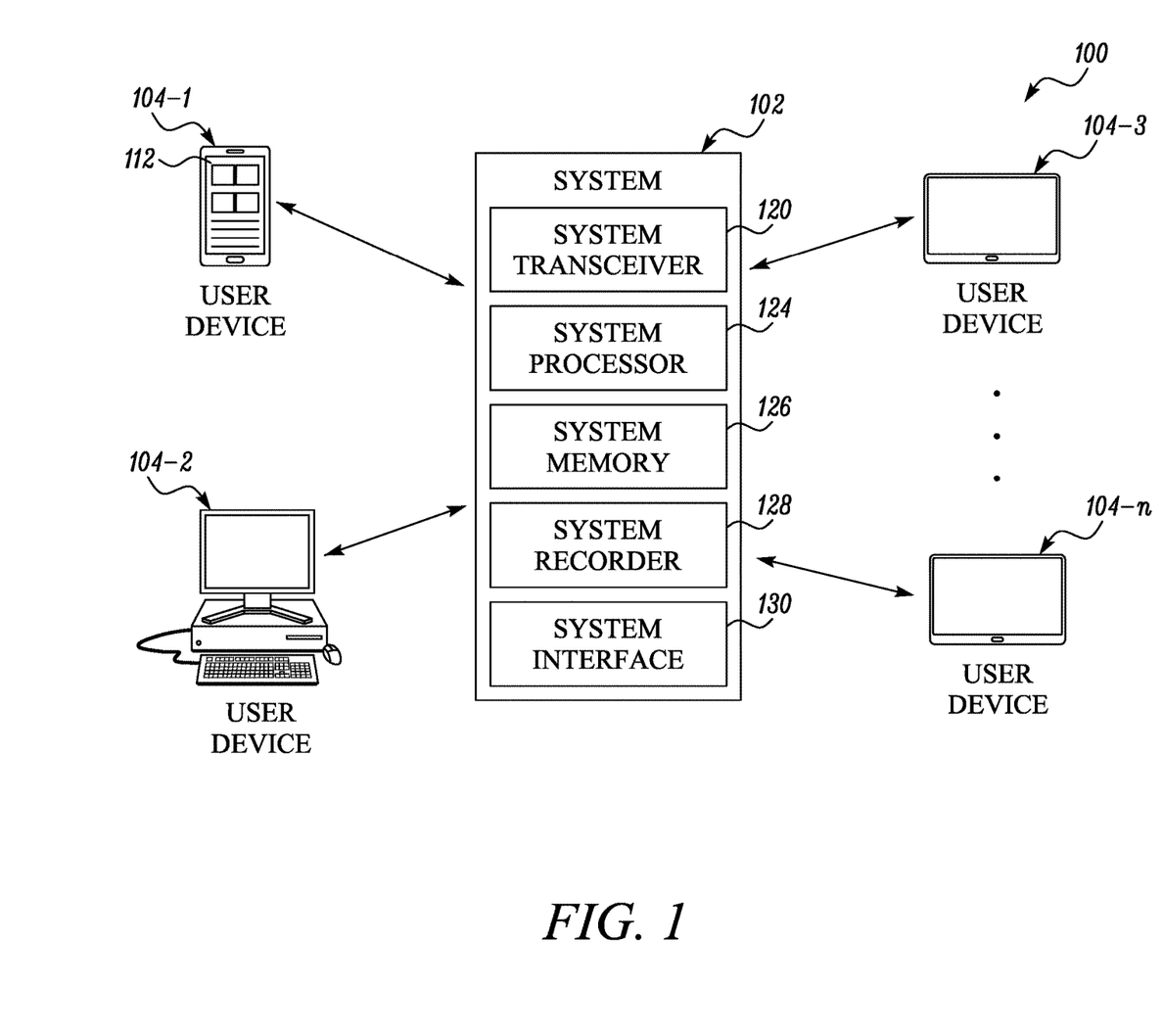
FIG. 1 illustrates an exemplary environment including a system for editing an audio stream, in accordance with some embodiments.

FIG. 1 illustrates an environment 100 implementing an exemplary system 102 for editing an audio stream, in accordance with various embodiments. The audio stream includes an audio corresponding to, but not limited to, a narration, a song, a speech, a podcast, an audio book, or any other audible content now known or in the future developed. The audio stream includes a plurality of audio segments, such as, a first audio segment and a second audio segment recorded in succession to the first audio segment. Each of the plurality of audio segment is separated from its preceding audio segment and/or succeeding audio segment by respective pause segments. For example, the first audio segment and the second audio segment are separated by a first pause segment. In accordance with various embodiments, the first pause segment defines a period of silence (for example, which corresponds to a period where there is no or negligible audio) that starts from an end of the first audio segment of the audio stream and ends at a start of the second audio segment of the audio stream.

In addition to the system 102, the environment 100 also includes one or more user devices 104, such as, 104-1, 104-2, . . . 104-n, communicating with the system 102 over a communication network (not shown). Although not illustrated, a person skilled in the art would appreciate that the communication network can include, but not limited to, a wide area network (WAN) (for example, a transport control protocol/internet protocol (TCP/IP) based network), a cellular network, or a local area network (LAN) employing any of a variety of communications protocols as is now known or in the future developed.

Each of the one or more user devices 104, such as, 104-1, 104-2, 104-3, . . . 104-n, operates as an interface for a corresponding user interacting with the system 102. Each user utilizes one or more user devices 104 to provide or feed one or more inputs, such as, but not limited to, the audio stream and one or more requests to edit the audio stream. Further, each user utilizes one or more user devices 104 to receive one or more outputs, such as, but not limited to, an audio file, from the system 102. The audio file corresponds to the audio stream edited by the system 102, as discussed in detail with reference to FIGS. 3 through 6. Each user device 104 includes a plurality of electrical and electronic components, providing power, operational control, communication, and the like, within the user device 104. The various components of the user device 104 will now be described with reference to FIG. 2.

Figure 2:
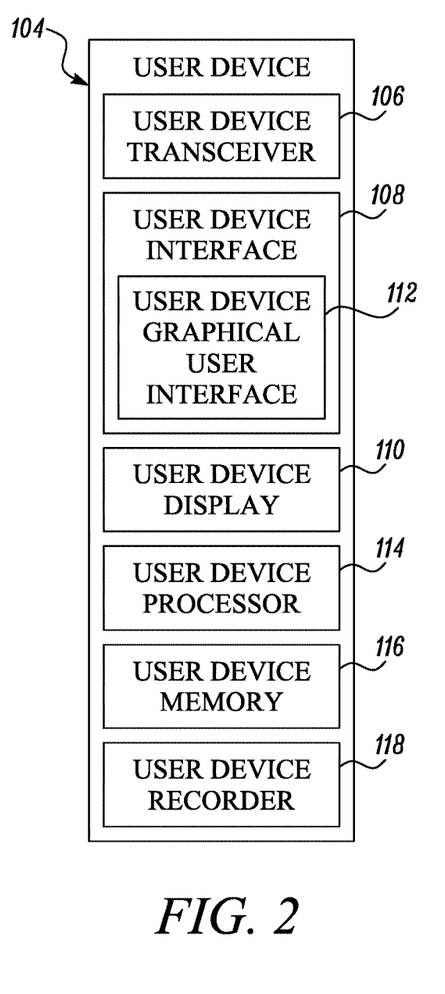
FIG. 2 illustrates a block diagram of an exemplary user device, in accordance with some embodiments.

It should be appreciated by those of ordinary skill in the art that FIG. 2 depicts the user device 104 in a simplified manner and a practical embodiment may include additional or lesser components and suitably configured logic to support known or conventional operating features that are not described in detail herein. It will further be appreciated by those of ordinary skill in the art that the user device 104 is one or more of a personal computer, desktop computer, tablet, smartphone, or any other computing device now known or developed in the future. Further, although the user device 104 is shown and described to be implemented within a single computing device, it may be contemplated that the one or more components of the user device 104 can alternatively be implemented in a distributed computing environment, without deviating from the scope of the claimed subject matter. It will further be appreciated by those of ordinary skill in the art that the user device 104 alternatively can function within a remote server, cloud computing device, or any other local or remote computing mechanism now known or developed in the future.

The user device 104 includes, among other components, a user device transceiver 106, a user device interface 108, a user device display 110, a user device processor 114, a user device memory 116, and a user device recorder 118. The components of the user device 104, including the user device transceiver 106, the user device interface 108, the user device display 110, the user device processor 114, the user device memory 116, and the user device recorder 118, cooperate with one another to enable operations of the user device 104. Each component can communicate with one another via a local interface (not shown). The local interface can be, for example, but not limited to, one or more buses or other wired or wireless connections, as is known in the art. The local interface can have additional elements, which are omitted for simplicity, such as controllers, buffers (caches), drivers, repeaters, and receivers, among many others, to enable communications. Further, the local interface can include address, control, and/or data connections to enable appropriate communications among the aforementioned components.

As illustrated, the user device 104 in the exemplary embodiment includes the user device transceiver 106 to provide the one or more inputs to and receive the one or more outputs from the system 102. The user device transceiver 106 includes a transmitter circuitry and a receiver circuitry to enable the user device 104 to communicate data to and acquire data from other devices such as the system 102. In this regard, the transmitter circuitry includes any appropriate circuitry, now known or in the future developed, to provide the one or more inputs, such as, but not limited to, the audio stream and the one or more requests to edit the audio stream, to the system 102. Similarly, the receiver circuitry includes any appropriate circuitry, now known or in the future developed, to receive the one or more outputs, such as, but not limited to, the audio file from the system 102. It will be appreciated by those of ordinary skill in the art that the user device 104 can include a single user device transceiver 106 as shown, or alternatively separate transmitting and receiving components, for example, but not limited to, a transmitter, a transmitting antenna, a receiver, and a receiving antenna.

The user device interface 108 is configured to receive input from and/or to provide output to the user or to one or more user devices or components. The input can be provided via, for example, a keyboard, a touch screen display (such as, the user device display 110), a touchpad, a microphone, a recorder (such as, the user device recorder 118), and/or a mouse or any other user input mechanism now known or developed in the future. The output can be provided via an output device, such as the user device display 110, a speaker, or any other output mechanism now known or developed in the future. The user device interface 108 can further include, for example, a serial port, a parallel port, an infrared (IR) interface, a universal serial bus (USB) interface and/or any other interface herein known or developed in the future.

In some embodiments, the user device interface 108 includes a user device graphical user interface 112 (as also shown in FIG. 1) through which the user communicates to and from the system 102. The user device graphical user interface 112 can be an application or web portal or any other suitable interface to edit the audio stream. The user device graphical user interface 112 includes one or more of graphical elements associated with editing the audio stream. The graphical elements can include, but is not limited to one or more of graphical icons, control buttons, timelines, selection boxes, progress indicators, pull-down menus, on-off checkmarks, scroll bars, windows, window edges, toggle buttons, forms, and the like. The graphical elements can be used in conjunction with text to prompt the user for the input, respond to user actions, or display information to the user in response to one or more instructions from the system 102.

The user device display 110 is configured to display data, images, and the like. The user device display 110 includes, for example, any display screen or a computer monitor now known or developed in the future. In accordance with some embodiments, the user device display 110 is configured to display the user device graphical user interface 112 associated with editing of the audio stream.

The user device memory 116 is a non-transitory memory configured to store a set of instructions that are executable by the user device processor 114 to perform predetermined operations. For example, the user device memory 116 can include any of the volatile memory elements (for example, random access memory (RAM), nonvolatile memory elements (for example, read only memory (ROM)), and combinations thereof. Moreover, the user device memory 116 can incorporate electronic, magnetic, optical, and/or other types of storage media. In some embodiments, the user device memory 116 is also configured to store files, such as but not limited to, the audio stream and the audio file.

The user device processor 114 is configured to execute the instructions stored in the user device memory 116 to perform the predetermined operations, for example, the detailed functions of the user device 104 as will be described hereinafter. The user device processor 114 can include one or more microprocessors, microcontrollers, DSPs (digital signal processors), state machines, logic circuitry, or any other device or devices that process information or signals based on operational or programming instructions. The user device processor 114 can be implemented using one or more controller technologies, such as Application Specific Integrated Circuit (ASIC), Reduced Instruction Set Computing (RISC) technology, Complex Instruction Set Computing (CISC) technology or any other similar technology now known or in the future developed. The user device processor 114 is configured to cooperate with other components of the user device 104 to perform operations pursuant to communications and one or more instructions from the system 102.

The user device recorder 118 includes, for example, any device that records a sound (for example, the audio stream) and converts it in one or more standard file formats for storage in the user device memory 116 and/or transmission to the system 102. In accordance with various embodiments, the user device recorder 118 is configured to record the audio stream having the first audio segment and the second audio segment. In accordance with various embodiments, the audio stream is recorded in a manner to include a pause segment defining the period of silence between two consecutive audio segments. For example, the second audio segment is recorded in succession to the first audio segment after or at the end of the first pause segment, using the user device recorder 118. In accordance with various embodiments, any pause segment in the audio stream is defined as a segment in the audio stream having a frequency between a predefined frequency range and a duration greater than or equal to a predetermined threshold duration. The predefined frequency range may correspond to a low-frequency range associated with no or negligible audio. The predetermined threshold duration may be defined by the user and generally corresponds to a duration greater than a duration of a typical pause introduced between words or sentences in an audio stream. For example, when the duration of the typical pause introduced between words or sentences in an audio stream is up to 0.5 seconds, the predetermined threshold duration can be set by a user to be equal to or greater than 0.5 seconds.

Referring back to FIG. 1, the system 102 is configured to obtain the audio stream and edit the audio stream to generate the audio file. The system 102 can be electrically and/or communicatively connected to a variety of devices, such as, the user device 104. In some embodiments, the system 102 includes a plurality of electrical and electronic components, providing power, operational control, communication, and the like within the system 102. For example, the system 102 includes, among other things, a system transceiver 120, a system processor 124, a system memory 126, a system recorder 128, and a system interface 130.

It should be appreciated by those of ordinary skill in the art that FIG. 1 depicts the system 102 in a simplified manner and a practical embodiment can include additional or lesser components and suitably configured logic to support known or conventional operating features that are not described in detail herein. It will further be appreciated by those of ordinary skill in the art that the system 102 can be a personal computer, desktop computer, tablet, smartphone, or any other computing device now known or developed in the future.

Further, although the system 102 is shown and described to be implemented within a single computing device, it may be contemplated that the one or more components of the system 102 can alternatively be implemented in a distributed computing environment, without deviating from the scope of the claimed subject matter. It will further be appreciated by those of ordinary skill in the art that the system 102 alternatively can function within a remote server, cloud computing device, or any other remote computing mechanism now known or developed in the future. For example, the system 102, in some embodiments, can be a cloud environment incorporating the operations of the system transceiver 120, the system processor 124, the system memory 126, the system recorder 128, and the system interface 130, and various other operating modules to serve as a software as a service model for the user devices 104. In some embodiments, the system 102 and the user device 104 can be implemented in a single device to perform the functions of both the system 102 and the user device 104, as will be described hereinafter. In some embodiments, one or more components of the system 102 can be implemented in the user device 104 and one or more or all of the remaining components of the system 102 can be implemented within a remote server or the system 102 itself.

The components of the system 102, including the system transceiver 120, the system processor 124, the system memory 126, the system recorder 128, and the system interface 130 can communicate with one another via a local interface (not shown). The local interface can be, for example, but not limited to, one or more buses or other wired or wireless connections, as is known in the art. The local interface can have additional elements, but not limited to, such as controllers, buffers (caches), drivers, repeaters, and receivers, among many others, to enable communications. Further, the local interface can include address, control, and/or data connections to enable appropriate communications among the aforementioned components.

The system transceiver 120 includes a transmitter circuitry and a receiver circuitry (not shown) to enable the system 102 to communicate data to and acquire data from other devices such as the user devices 104. In this regard, the transmitter circuitry can include any appropriate circuitry, now known or in the future developed, to transmit data such as, but not limited to, the audio file. Similarly, the receiver circuitry can include any appropriate circuitry, now known or in the future developed, to receive data such as, but not limited to, the audio stream and the one or more requests to edit the audio stream. The transmitter circuitry and the receiver circuitry together form a wireless transceiver to enable wireless communication with the user device 104. It will be appreciated by those of ordinary skill in the art that the system 102 can include a single system transceiver 120 as shown, or alternatively separate transmitting and receiving components, for example but not limited to, a transmitter, a transmitting antenna, a receiver, and a receiving antenna.

The system memory 126 is a non-transitory memory configured to store a set of instructions that are executable by the system processor 124 to perform the predetermined operations. For example, the system memory 126 can include any of the volatile memory elements (for example, random access memory (RAM), nonvolatile memory elements (for example read only memory (ROM)), and combinations thereof. Moreover, the system memory 126 can incorporate electronic, magnetic, optical, and/or other types of storage media. In some embodiments, the system memory 126 is also configured to store files, such as, but not limited to, the audio stream and the audio file.

The system processor 124 is configured to execute the instructions stored in the system memory 126 to perform the predetermined operations, for example the detailed functions of the system 102 as will be described hereinafter. The system processor 124 can include one or more microprocessors, microcontrollers, DSPs (digital signal processors), state machines, logic circuitry, or any other device or devices that process information or signals based on operational or programming instructions. The system processor 124 can be implemented using one or more controller technologies, such as Application Specific Integrated Circuit (ASIC), Reduced Instruction Set Computing (RISC) technology, Complex Instruction Set Computing (CISC) technology or any other similar technology now known or in the future developed.

The system recorder 128 includes, for example, any device that records a sound (for example, the audio stream) and converts it in one or more standard file formats. In accordance with various embodiments, the system recorder 128 is configured to record the audio stream having the first audio segment and the second audio segment. As discussed above, the audio stream is recorded in a manner to include the pause segment defining the period of silence between two consecutive audio segments. For example, the second audio segment is recorded in succession to the first audio segment after the first pause segment, using the system recorder 128.

The system interface 130 is configured to receive input from and/or to provide output to one or more users of the system 102. The input can be provided via, for example, a keyboard, a touch screen display, a touchpad, a microphone, a recorder (such as, the system recorder 128), and/or a mouse or any other user input mechanism now known or developed in the future. The output can be provided via an output device such as a display, a speaker, or any other output mechanism now known or developed in the future. The system interface 130 can further include, for example, a serial port, a parallel port, an infrared (IR) interface, a universal serial bus (USB) interface and/or any other interface herein known or developed in the future.

Figure 3:
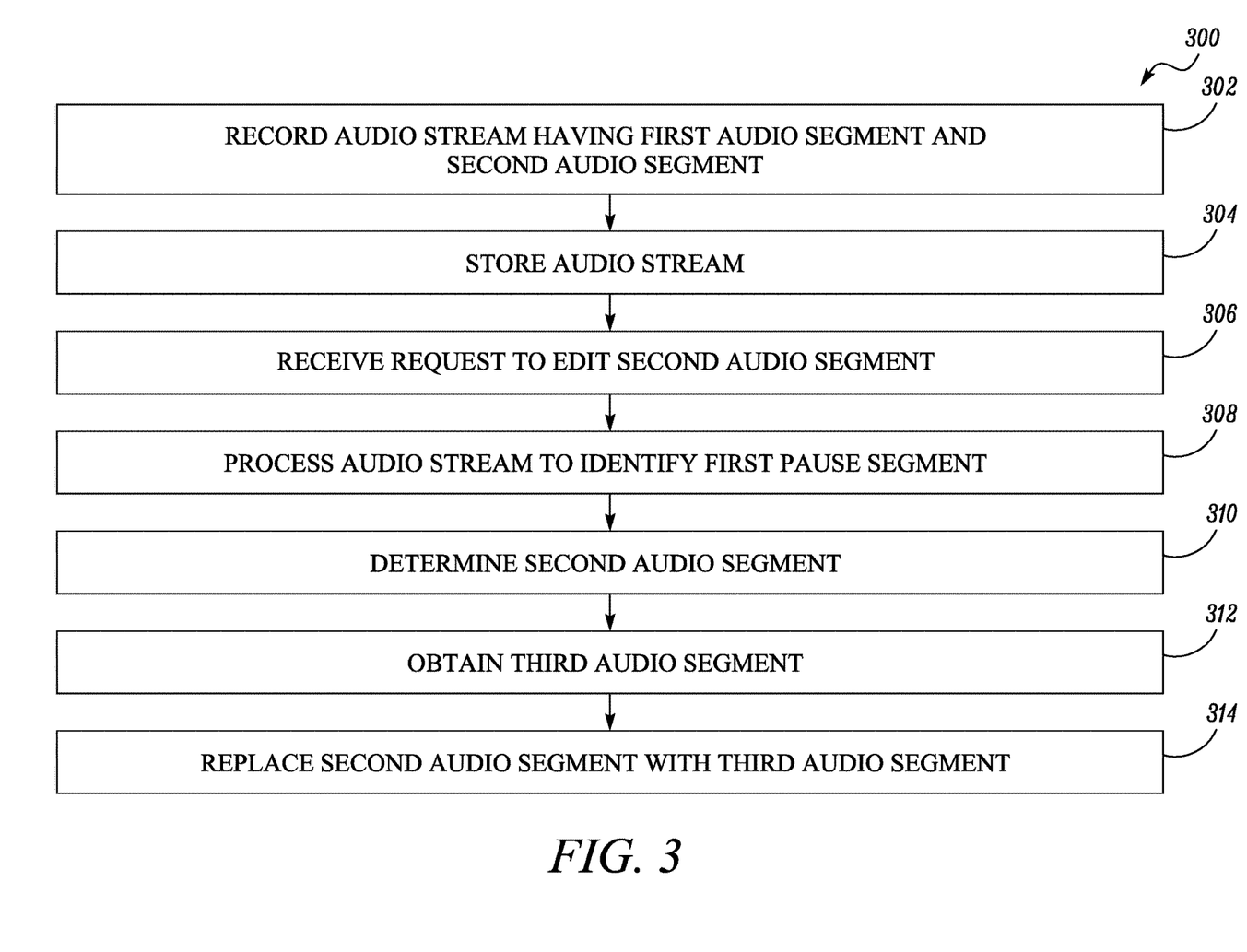
FIGS. 3 through 6 illustrate an exemplary method for editing the audio stream, in accordance with some embodiments.

FIG. 3 illustrates a method 300 to edit the audio stream. At 302, the method begins with the system 102 obtaining the audio stream having the plurality of audio segments, such as, the first audio segment and the second audio segment. In an embodiment, the system 102 obtains the audio stream by using the system recorder 128 to record the audio stream. In some embodiments, the system 102 obtains the audio stream, via the system transceiver 120, recorded by the user device recorder 118 of the user device 104. The system 102 can obtain the audio stream in real-time while it is being recorded by the system recorder 128 or the user device recorder 118.

Figure 4:
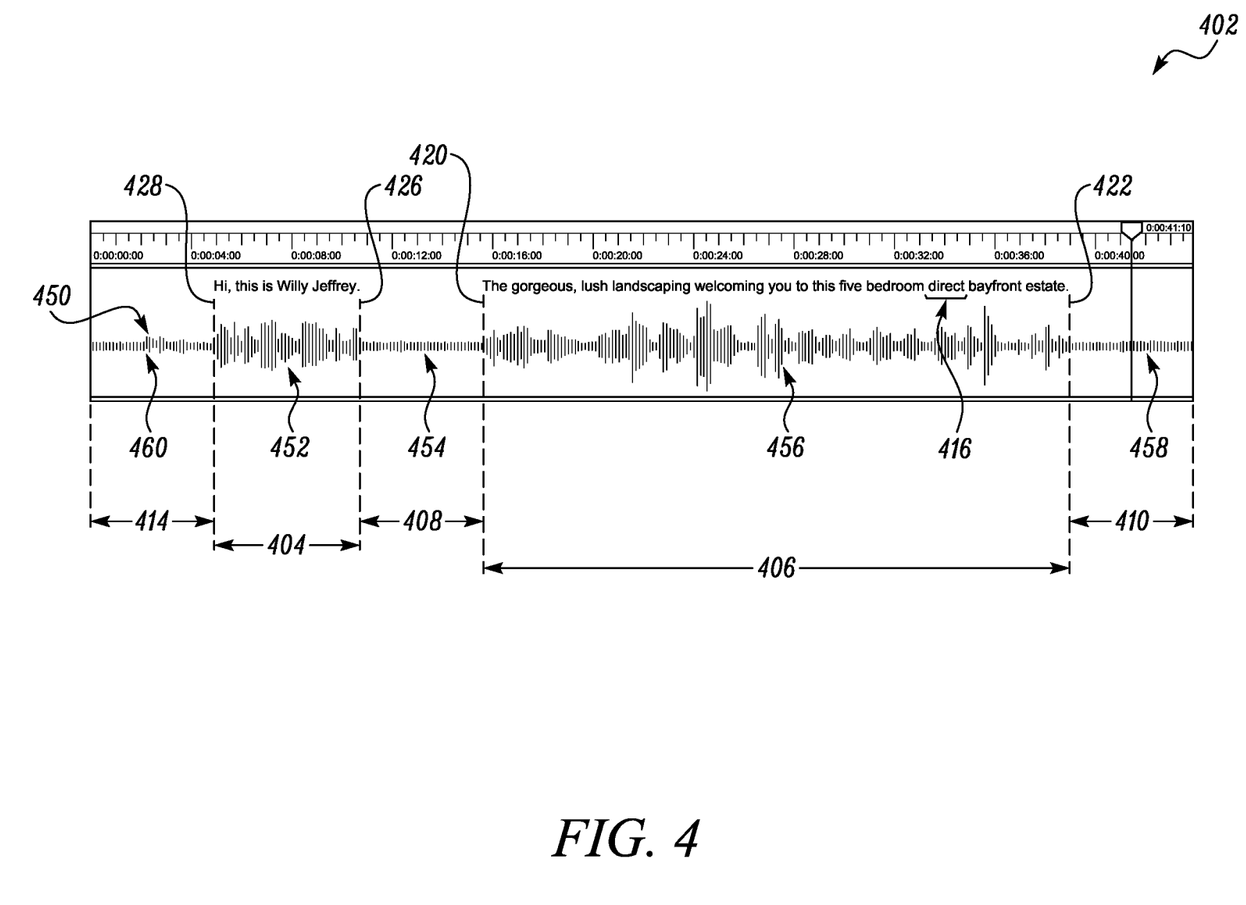

For example, as shown in FIG. 4, the system 102 obtains the audio stream 402 having the first audio segment 404 and the second audio segment 406 separated by the first pause segment 408. The first pause segment 408 starts from the end of the first audio segment 404 of the audio stream 402 and ends at the start of the second audio segment 406 of the audio stream 402. Although not shown, in some embodiments, the audio stream 402 can include one or more audio segments recorded prior to the first audio segment 404 (when the audio stream does not begin with the first audio segment 404) and/or in succession to the second audio segment 406 (when the audio stream does not end with the second audio segment 406). Each of the one or more audio segments (not shown) is separated from its preceding and/or succeeding audio segment by a respective pause segment. For example, as shown in FIG. 4, the second audio segment 406 is separated from its succeeding audio segment (not shown) by a second pause segment 410 and the first audio segment 404 can be separated from its preceding audio segment (not shown) by a fourth pause segment 414.

Referring back to FIG. 3, at 304, the system processor 124 stores the audio stream in the system memory 126. At 306, the system processor 124 receives a request to edit the second audio segment, for example, the second audio segment 406 of the audio stream 402 shown in FIG. 4. The system processor 124 can receive the request from the user via the user device interface 108 or the system interface 130. In an exemplary scenario shown in FIG. 4, the system processor 124 may receive a request to edit the second audio segment 406 to correct an error 416 in the content narrated in the audio stream 402. The request includes one or more of a combination of a key press, a screen touch, a mouse click, an audible instruction, a selection of graphical element, or any trigger, now known or developed in the future.

In some embodiments, the number of mouse clicks, key presses, audible instructions, selection of graphical element, or screen touches required to request the editing of the second audio segment 406 may depend upon the positioning of the second audio segment 406 in the audio stream 402. When the audio stream 402 includes the one or more audio segments recorded in succession to the second audio segment 406, the number of mouse clicks, key presses, audible instructions, selections of graphical element, or screen touches depends on the positioning of the second audio segment 406 with respect to the one or more audio segments recorded in succession to the second audio segment 406. In an embodiment, when the audio stream 402 includes N audio segments recorded in succession to the second audio segment 406, the number of mouse clicks, key presses, audible instructions, selections of graphical element, or screen touches required for requesting the editing of the second audio segment 406 may be N+1. For example, when the audio stream 402 ends with the second audio segment 406 (i.e., N=0), a single mouse click, a key press, audible instruction, selection of graphical element, or a screen touch is considered as a request to edit the second audio segment 406. Similarly, when the audio stream 402 includes one audio segment (i.e., N=1) recorded in succession to the second audio segment 406, the number of mouse clicks, key presses, audible instructions, selections of graphical element, or screen touches required would be 2 (i.e., N+1), and so on.

Referring back to FIG. 3, at 308, the system processor 124 processes the audio stream 402 to identify the first pause segment, for example, the first pause segment 408 shown in FIG. 4, defining the period of silence from the end of the first audio segment 404 of the audio stream 402 to the start of the second audio segment 406 of the audio stream 402. To this end, the system processor 124 analyzes a waveform, for example, waveform 450 shown in FIG. 4, corresponding to the audio stream 402. Particularly, the system processor 124 determines a portion 454 of the waveform 450 having a frequency between the predefined frequency range. The first audio segment 404 and the second audio segment 406 correspond to corresponding portions 452 and 456 of the waveform 450 each having a frequency outside the predefined frequency range. The system processor 124 further assigns the portion 454 to be the first pause segment 408 when the duration of the first pause segment 408 is greater than or equal to the predetermined threshold duration. As discussed above, the predetermined threshold duration may be defined by the user and generally corresponds to a duration greater than a duration of a typical pause introduced between words or sentences in an audio stream.

Referring back to FIG. 3, at 310, the system processor 124 determines the second audio segment—for example, the second audio segment 406 is shown in FIG. 4. The second audio segment 406 is determined as a segment within the audio stream 402 beginning at the end of the first pause segment 408 and terminating either at the end of the audio stream or at the beginning of the second pause segment 410 recorded in succession to the second audio segment 406. For example, the start of the second audio segment 406 is determined as the end 420 of the first pause segment 408, as shown in FIG. 4. When the audio stream 402 ends at the second audio segment 406, the end of the second audio segment 406 is determined as the end of the audio stream 402. Similarly, when the audio stream 402 includes the one or more audio segments (not shown) recorded in succession to the second audio segment 406, the end of the second audio segment 406 is determined as terminating at a beginning 422 of the second pause segment 410 recorded in succession to the second audio segment 406. In order to determine the beginning 422 of the second pause segment 410 or the end of the second audio segment 406, the system processor 124 analyzes the waveform 450 (shown in FIG. 4) corresponding to the audio stream 402 to determine a portion 458 of the waveform 450 having a frequency between the predefined frequency range, a duration greater than or equal to the predetermined threshold duration, and occurring after the stan/beginning of the second audio segment 406. The system processor 124 then determines the beginning 422 of the determined portion 458 as the end of the second audio segment 406.

Figure 5:
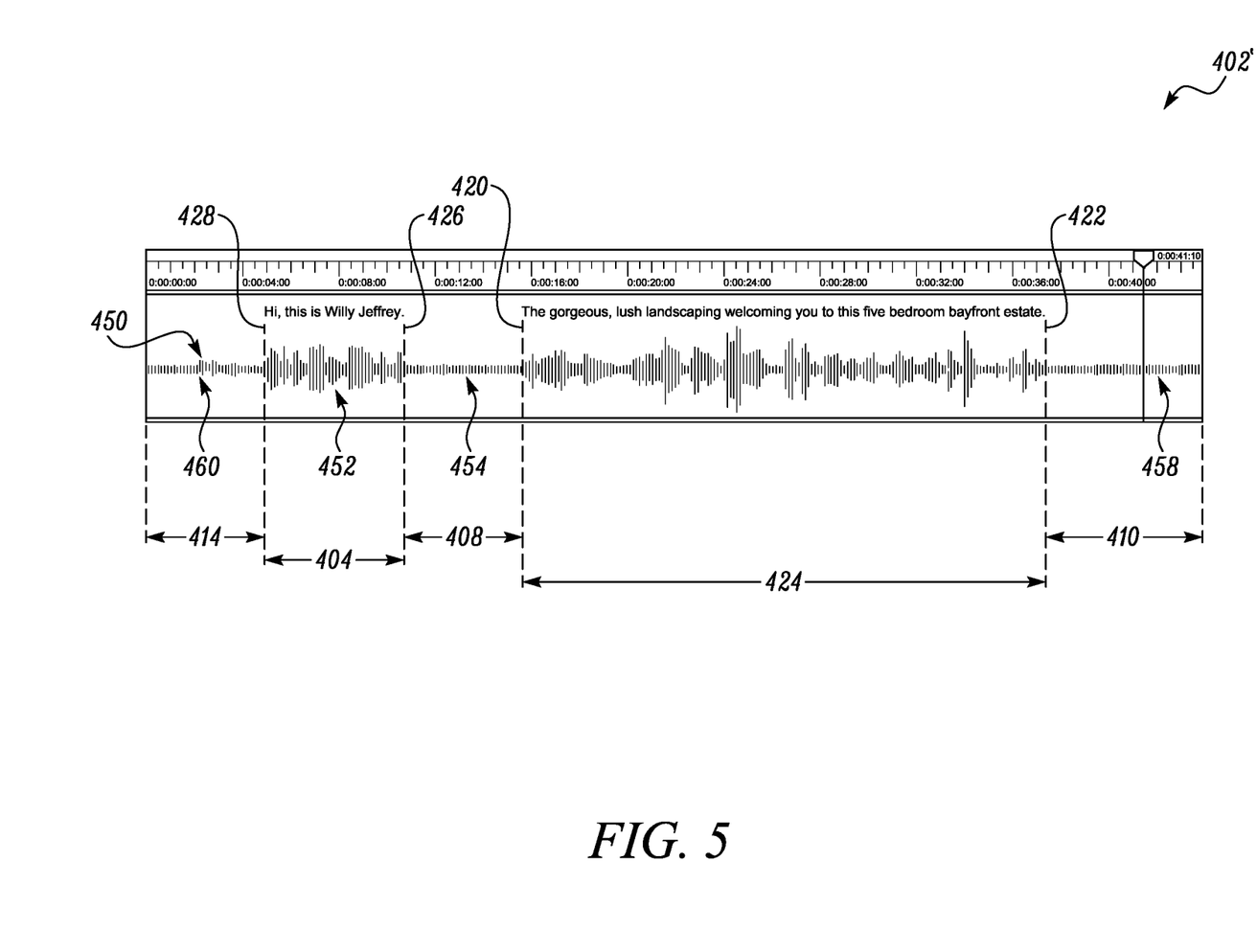

Referring back to FIG. 3, at 312, the system processor 124 obtains a third audio segment, for example, the third audio segment 424 is shown in FIG. 5 and includes a revised version of the second audio segment 406. The system 102 can obtain the third audio segment 424 by using the system recorder 128 to record the third audio segment 424. In some embodiments, the system 102 can obtain the third audio segment 424 recorded by the user device recorder 118 of the user device 104, via the system transceiver 120. The system processor 124 stores the first audio segment 404 as a first audio segment file and the third audio segment 424 as a second audio segment file in the system memory 126.

In an embodiment, the system processor 124 provides an indication to the user via the user device interface 108 or the system interface 130 to record the third audio segment 424. For example, the indication can include notification, such as a countdown, displayed on the user device interface 108 or the system interface 130 to record the third audio segment 424. In some cases, the notification can be displayed after playing at least a portion of the first audio segment 404 via an output device, such as the user device interface 108 or the system interface 130. To this end, the system processor 124 can determine the first audio segment 404 in the audio stream 402. In accordance with various embodiments, the first audio segment 404 can be determined as a segment within the audio stream 402 terminating at the start of the first pause segment 408 and beginning either at the start of the audio stream 402 or at the end of the fourth pause segment 414 recorded prior to the first audio segment 404. For example, the end of the first audio segment 404 is determined as the start 426 of the first pause segment 408, as shown in FIGS. 4 and 5. When the audio stream 402 starts with the first audio segment 404, the start of the first audio segment 404 is determined as the start of the audio stream 402. Similarly, when the audio stream 402 includes the one or more audio segments (not shown) recorded prior to the first audio segment 404, the start of the first audio segment 404 is determined as the end 428 of the fourth pause segment 414 recorded prior to the first audio segment 404. In order to determine the end 428 of the fourth pause segment 414 or the start of the first audio segment 404, the system processor 124 may analyze the waveform 450 corresponding to the audio stream 402 to determine a portion 460 of the waveform 450 having a frequency between the predefined frequency range, a duration greater than or equal to the predetermined threshold duration and occurring prior to the determined end of the first audio segment 404. The system processor 124 then determines the end 428 of the determined portion 460 as the start of the first audio segment 404.

Referring back to FIG. 3, at 314, the system processor 124 replaces the second audio segment 406 with the third audio segment 424 in the audio stream 402 to obtain an edited audio stream 402' shown in FIG. 5. In some embodiments, the system processor 124 can provide an option to the user, via the user device interface 108 or the system interface 130 to playback the edited audio stream 402'. In such cases, when the user determines that he wants to keep the second audio segment 406 in the audio stream 402' and discard the third audio segment 424, the system processor 124 can replace the third audio segment 424 with the second audio segment 406 in the audio stream 402' based on the request from the user.

In some embodiments, when the second audio segment 406 is replaced with the third audio segment 424, the system processor 124 can receive and/or determine a further request (for example, from the user) to edit the replaced audio segment, i.e., the third audio segment 424, as well. The system processor 124, in such cases, returns to operation 306 and continues with the subsequent operations, as described above, to edit the audio segment. It will be appreciated that a replacement of an audio segment can occur multiple times and can be carried out for any audio segment in the audio stream for any number of times to generate the audio file.

Figure 6:
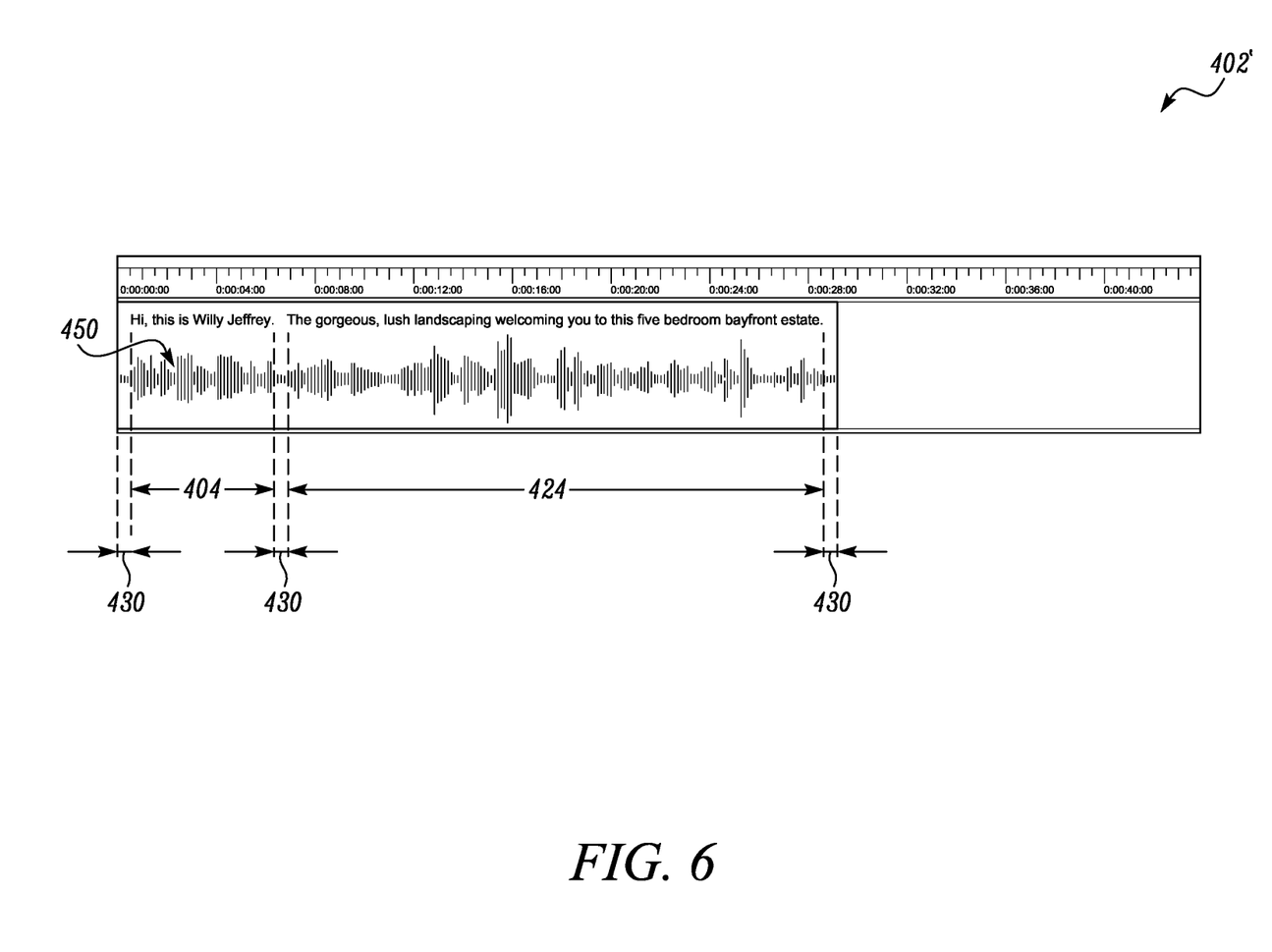

The system processor 124 then generates the audio file corresponding to the edited audio stream 402', upon receiving a request from the user, for example, via the user device interface 108 or the system interface 130. The system processor 124, upon receiving the request, merges the first audio segment file and the second audio segment file to generate the audio file. In some embodiments, the system processor 124 merges the first audio segment file and the second audio segment file by adding a third pause segment in the audio file between the first audio segment file and the second audio segment file. Alternatively, the system processor 124 replaces the plurality of pause segments, such as the first pause segment and the second pause segment, in the audio file with the third pause segment in the audio stream. The third pause segment is of a predetermined duration that is less than each of the duration of the first pause segment and the duration of the second pause segment. For example, FIG. 6 shows the third pause segment 430, between the first audio segment 404 and the second audio segment 406, having a duration less than each of the duration of the first pause segment 408 (shown in FIGS. 4 and 5) and the duration of the second pause segment 410 (shown in FIGS. 4 and 5).

Figure 7:
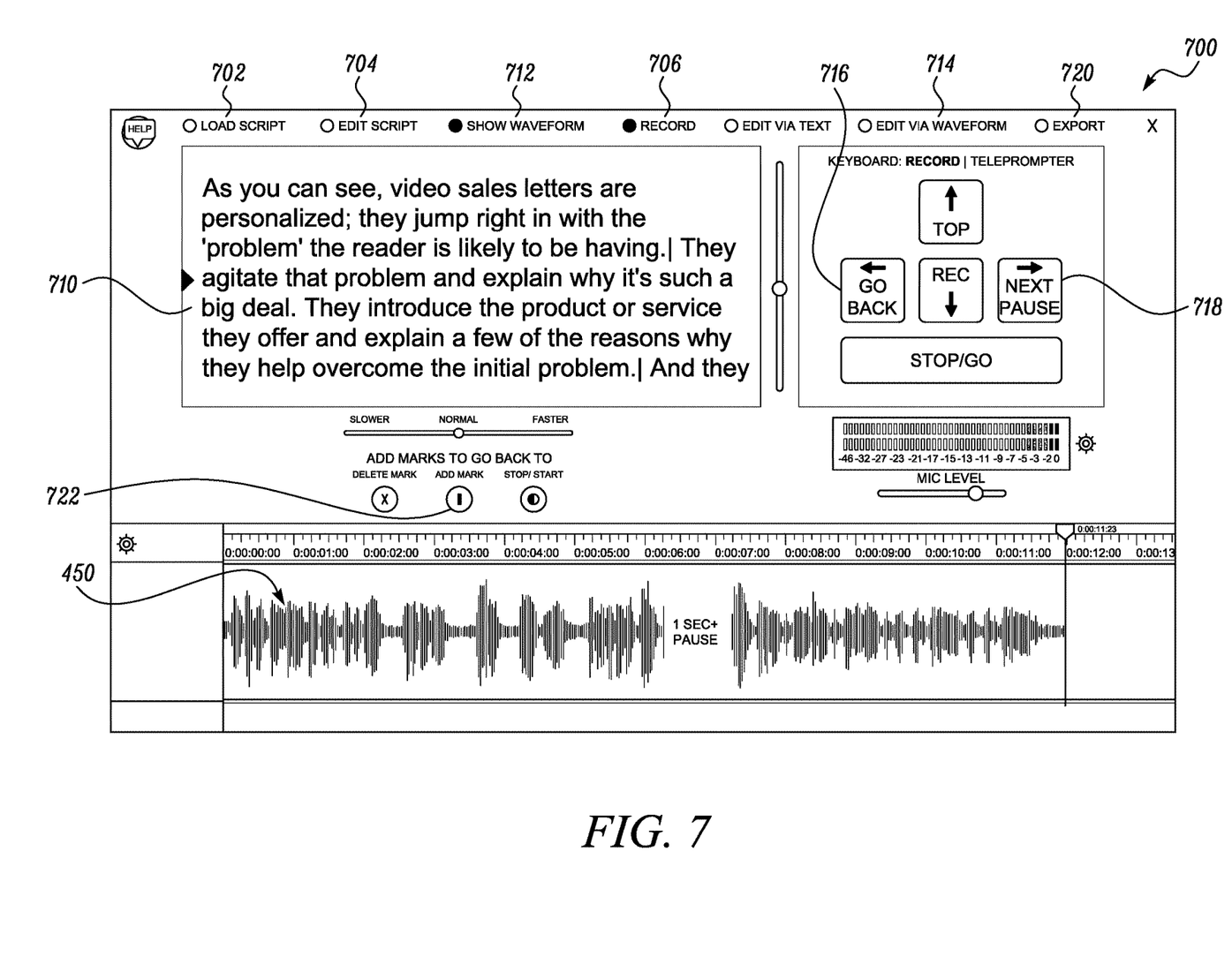
FIG. 7 illustrates a user interface for editing the audio stream, in accordance with some embodiments.

FIG. 7 illustrates a user interface 700 for editing the audio stream 402, in accordance with various embodiments. The system 102 enables the user to record and edit the audio stream 402 using one or more options provided on the user interface 700. For example, the system 102 enables the user to import and display a script 710 associated with the audio stream 402 via a load script option 702. Similarly, the system 102 enables the user to edit the displayed script 710, using one or more techniques known in the art or developed in the future, via an edit script option 704. In some embodiments, the system 102 enables the user to identify the start of each audio segment (hereinafter also referred to as a 'go back' point) in the script 710 displayed on the user interface 700, for example, by adding marks in the script 710 via an add mark option 722. The marks enable the user to identify the start of each audio segment and introduce a pause segment before the start of each audio segment while recording the audio stream 402. The system 102 further enables the user to record the audio stream 402 via a record option 706 provided on the user interface 700. As discussed above, the audio stream 402 is recorded such as to include a pause segment between two consecutive audio segments of the audio stream for identification of the start of each audio segment.

The system 102 also provides the user an option to show and edit the waveform 450 corresponding to the audio stream 402 via a show waveform option 712 and an edit via waveform option 714, respectively. Upon receiving the request to edit the waveform 450, the system 102 enables the user to edit the waveform 450, for example, delete or rearrange a portion of the waveform 450, using one or more techniques known in the art or developed in the future. The system 102 also enables the user to export the audio stream via an export option 720 provided on the user interface 700 such that the audio stream could be shared with multiple users or participants. In accordance with various embodiments, the system 102 also enables the user to navigate the audio stream 402 to a desired audio segment of the audio stream 402 via a go back option 716 and/or a next pause option 718.

Figure 8:
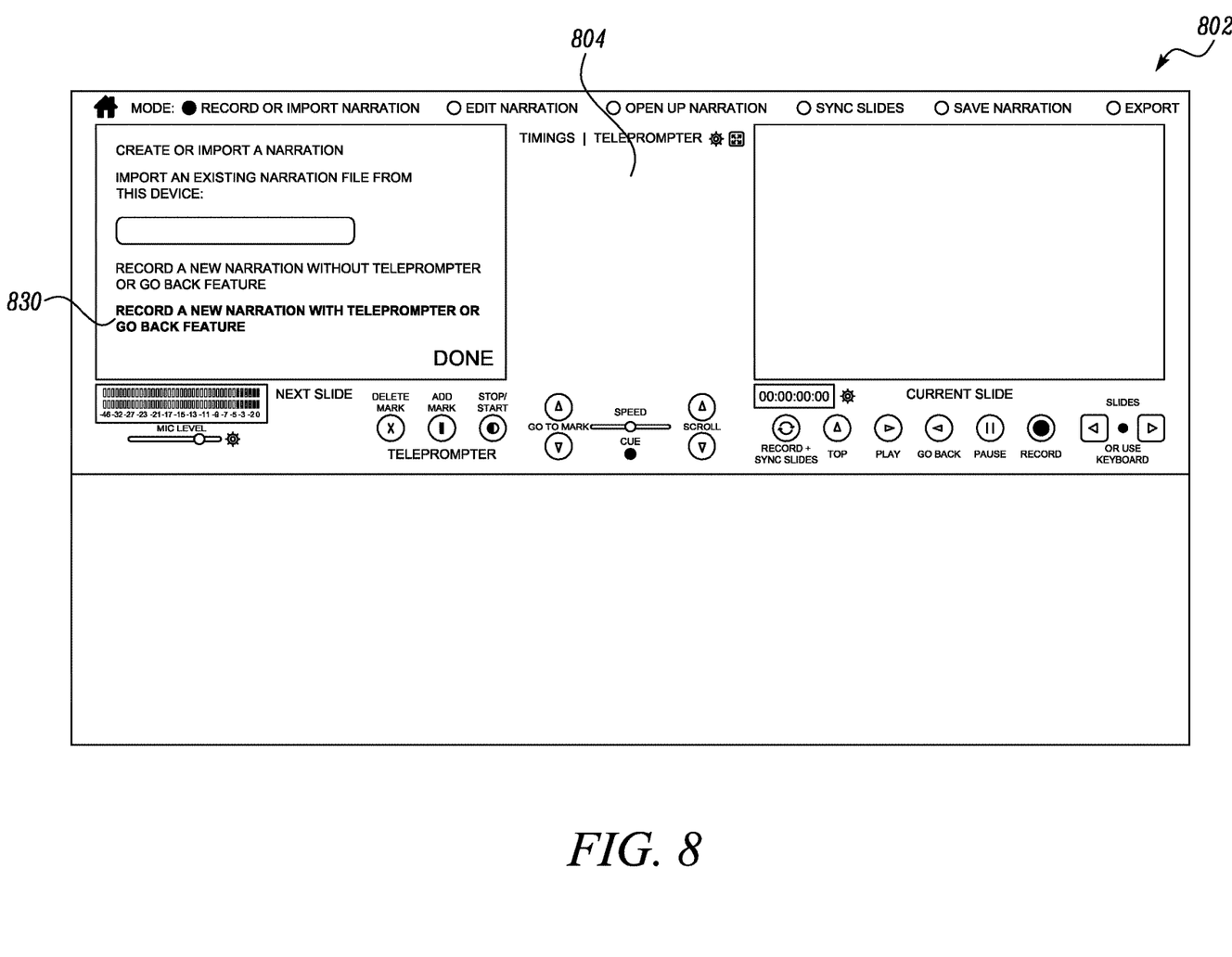
FIGS. 8 through 10 illustrate exemplary implementations for editing the audio stream, in accordance with some embodiments.
Figure 9:
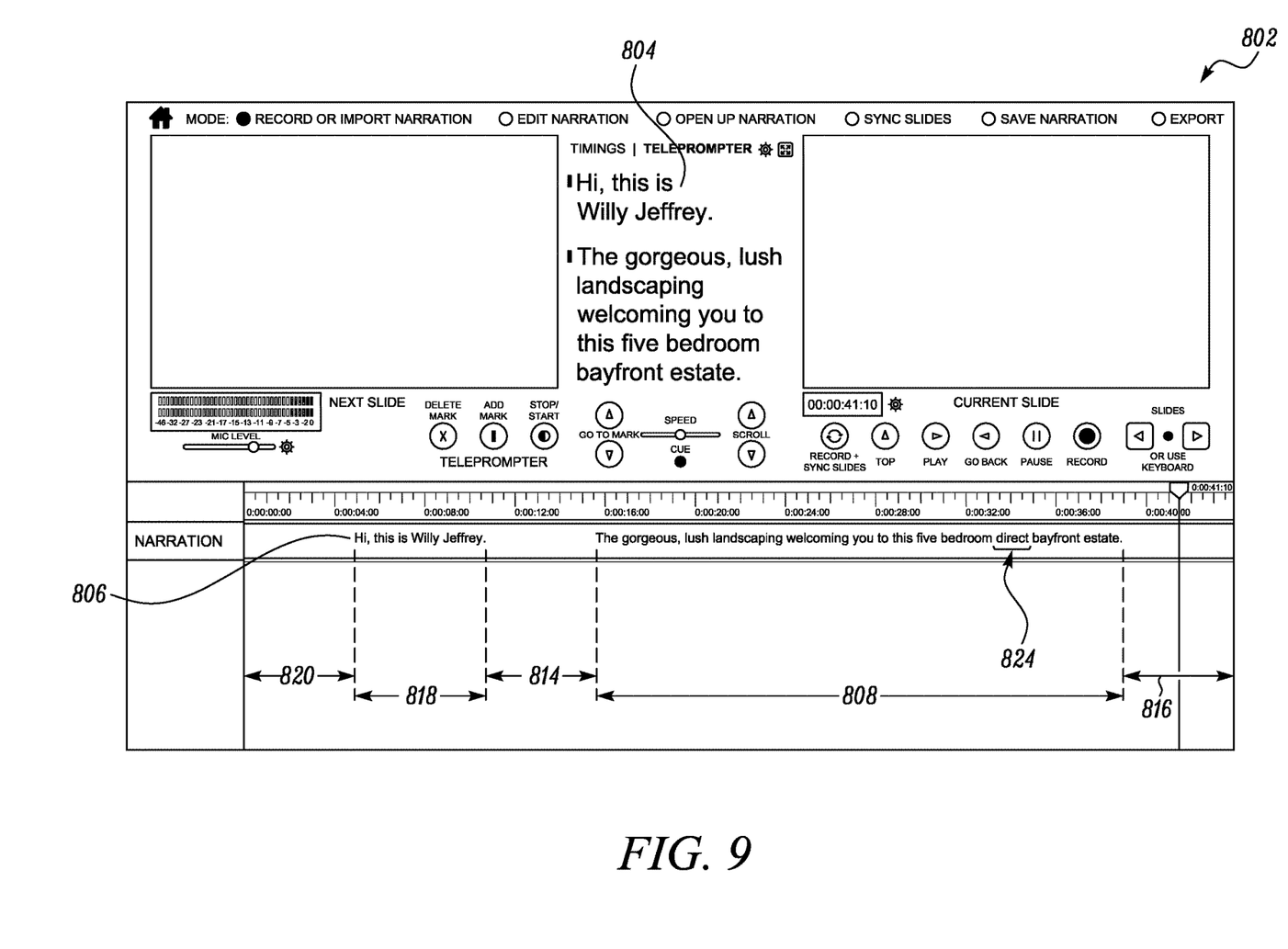
Figure 10:
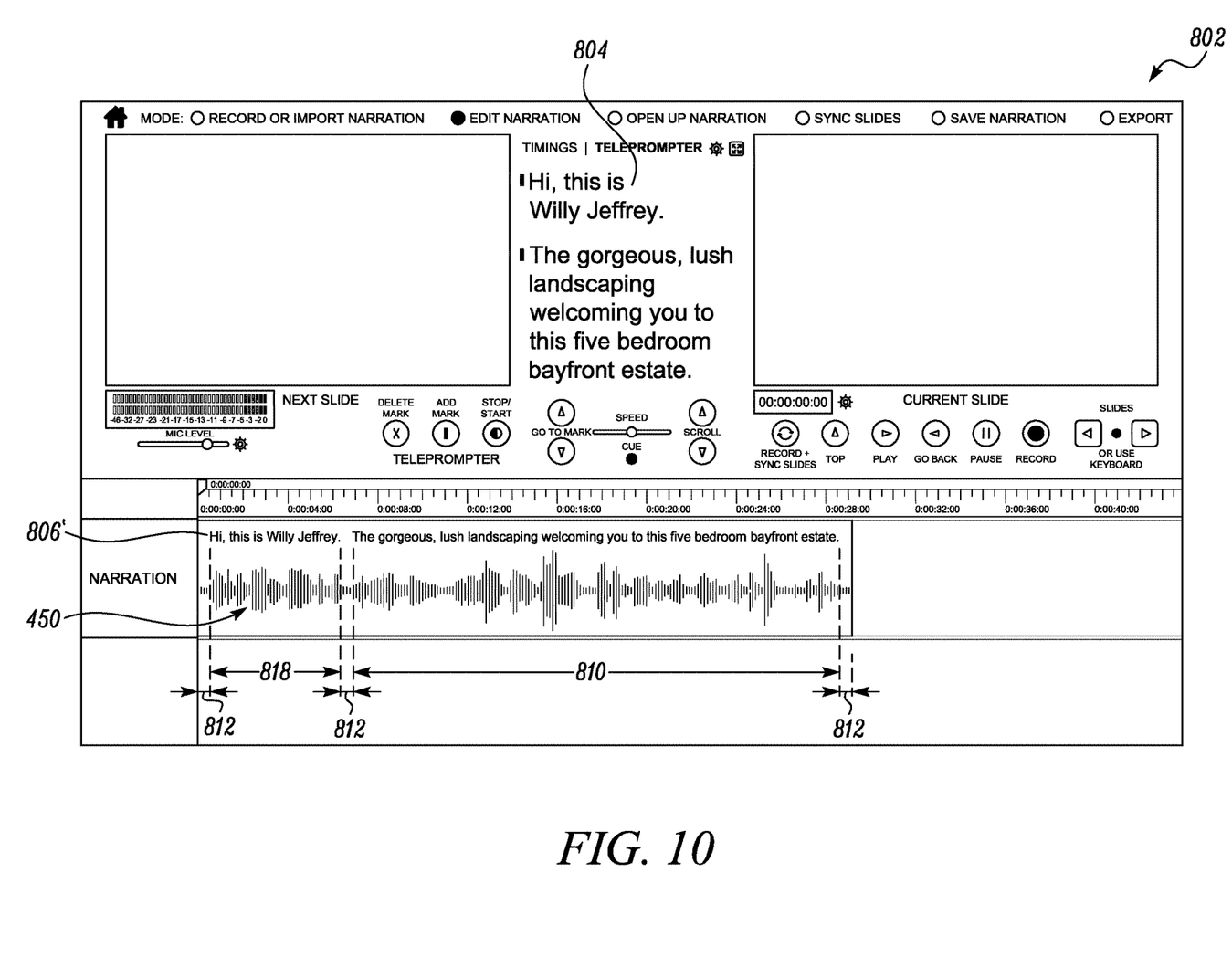

FIGS. 8 through 10 illustrate an exemplary implementation of the editing of the audio stream 806, in accordance with various embodiments. The system and the method for editing of the audio stream 806 may be implemented for synchronizing one or more slides with an audio stream, although the system 102 can be used in an environment that includes audio alone, and which includes no corresponding slides. As shown in FIG. 8, an exemplary user interface 802 associated with synchronizing a plurality of slides with the audio stream 806 may provide an option 830 to a user to record the audio stream 806. The user interface 802 may also provide a teleprompter 804 to assist the user in recording the audio stream 806, as shown in FIG. 9. The audio stream 806 is then recorded in a manner that each audio segment of the audio stream 806 is separated from its preceding audio segment and/or succeeding audio segment by a pause segment. Upon receiving the audio stream 806 from the user, an option is provided to the user to request editing of an audio segment of the audio stream 806.

Upon receiving a request from the user to edit the second audio segment 808 of the audio stream 806, for example, to correct the error 824, the system 102 processes the audio stream 806 to identify the second audio segment 808 and replace the second audio segment 808 with a third audio segment 810, as shown in FIG. 10. The system 102 also generates the audio file corresponding to the edited audio stream 806' by adding a third pause segment 812 or replacing the pause segments 820, 814, 816 in the audio stream 806' with the third pause segment 812, in accordance with various embodiment described above. In some embodiments, the system 102 can be implemented within a system for synchronizing one or more videos with an audio stream, in the manner described above.

The system 102 and the method 300 of the present disclosure provide a simple and easy solution to edit and rerecord one or more audio segments of an audio stream, without the need to redo the entire audio stream. With something as simple as mouse click, press of a button, audible instruction, or selection of a graphical element, the system and the method of the present disclosure determine the audio segment, in the audio stream, to be edited and rerecorded. The insertion of the pause segments between the audio segment during recording of the audio stream enables the system to identify various audio segments of the audio stream effectively and without the use of any complex audio recording and editing tools.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential feature or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The invention claimed is:

1. A method for editing an audio stream, the method comprising:
    recording, by a recorder, an audio stream having a first audio segment, a first pause segment, and a second audio segment, wherein the first pause segment is recorded in succession to the first audio segment and the second audio segment is recorded in succession to the first pause segment, wherein the pause segment is inserted to identify an end of the first audio segment and a start of the second audio segment;
    storing, by a processor, the audio stream in a memory;
    receiving, by the processor, a request to re-record the second audio segment of the audio stream, wherein receiving the request includes receiving one or more commands from a user;
    determining, by the processor, a number of the one or more commands provided by the user;
    identifying, by the processor, the first pause segment corresponding to the second audio segment for which the request to re-record is received based on the number of commands, wherein the number of commands indicates a position of the first pause segment in the audio stream, wherein the first pause segment defines a period of silence from the end of the first audio segment of the audio stream to the start of the second audio segment of the audio stream;
    determining, by the processor, a position of the second audio segment based on the identified first pause segment, wherein the second audio segment is determined as a segment within the audio stream beginning at an end of the first pause segment and terminating either at an end of the audio stream or at a beginning of a second pause segment recorded in succession to the second audio segment;
    obtaining, by the processor, a third audio segment including a re-recorded version of the second audio segment, wherein obtaining the third audio segment includes automatically issuing, by the processor, a notification to provide the third audio segment upon playing a portion of the first audio segment without user intervention; and
    replacing, by the processor, the second audio segment with the third audio segment.

2. The method of claim 1, further including:
    storing, by the processor, the first audio segment as a first audio segment file and the third audio segment as a second audio segment file in the memory;
    merging, by the processor, the first audio segment file and the second audio segment file to generate an audio file corresponding to the audio stream.

3. The method of claim 2, wherein the merging includes adding, by the processor, a third pause segment in the audio file between the first audio segment file and the second audio segment file.

4. The method of claim 3, wherein the third pause segment is of a predetermined duration.

5. The method of claim 4, wherein the predetermined duration is less than each of a duration of the first pause segment and a duration of the second pause segment.

6. The method of claim 1, further including:
    replacing, by the processor, the first pause segment and the second pause segment correspondingly with a third pause segment in the audio stream.

7. The method of claim 1, wherein processing the audio stream to identify the first pause segment includes:
    analyzing, by the processor, a waveform corresponding to the audio stream;
    determining, by the processor, a portion of the waveform having a frequency between a predefined frequency range,
    assigning, by the processor, the portion to be the first pause segment when a duration of the first pause segment is greater than or equal to a predetermined threshold duration.

8. The method of claim 7, wherein the first audio segment and the second audio segment correspond to corresponding portions of the waveform each having a frequency outside the predefined frequency range.

9. The method of claim 1, wherein obtaining the third audio segment includes:
    determining, by the processor, the first audio segment as a segment within the audio stream terminating at a start of the first pause segment and beginning either at a start of the audio stream or at an end of a fourth pause segment recorded prior to the first audio segment.

10. The method of claim 1, further includes replacing the third audio segment with the second audio segment in the audio stream based on a request from the user.

11. The method of claim 1, wherein the request to re-record the second audio segment includes one of a mouse click, a key press, or a screen touch, and wherein the request to re-record is to correct an error in a speech corresponding to the second audio segment.

12. A system for editing an audio stream, the system comprising:
    a recorder configured to record an audio stream having a first audio segment, a first pause segment, and a second audio segment, wherein the first pause segment is recorded in succession to the first audio segment and the second audio segment is recorded in succession to the first pause segment, wherein the pause segment is inserted to identify an end of the first audio segment and a start of the second audio segment;
    a memory configured to store the audio stream; and
    a processor communicatively coupled to the recorder and the memory, wherein the memory stores instructions executable by the processor, and wherein upon execution of the stored instructions the processor is configured to:
        receive a request to re-record the second audio segment of the audio stream, wherein receiving the request includes receiving one or more commands from a user;

determine a number of the one or more commands provided by the user;

identify the first pause segment corresponding to the second audio segment for which the request to re-record is received based on the number of commands, wherein the number of commands indicates a position of the first pause segment in the audio stream, wherein the first pause segment defines a period of silence from the end of the first audio segment of the audio stream to the start of the second audio segment of the audio stream;

determine a position of the second audio segment based on the identified first pause segment, wherein the second audio segment is determined as a segment within the audio stream beginning at an end of the first pause segment and terminating either at an end of the audio stream or at a beginning of a second pause segment recorded in succession to the second audio segment;

obtain a third audio segment including a re-recorded version of the second audio segment, wherein obtaining the third audio segment includes automatically issuing, by the processor, a notification to provide the third audio segment upon playing a portion of the first audio segment without user intervention; and replace the second audio segment with the third audio segment.

13. The system of claim 12, wherein the processor is further configured to:
store the first audio segment as a first audio segment file and the third audio segment as a second audio segment file in the memory;
merge the first audio segment file and the second audio segment file to generate an audio file corresponding to the audio stream.

14. The system of claim 13, wherein the processor is configured to merge the first audio segment file and the second audio segment file by adding a third pause segment in the audio file between the first audio segment file and the second audio segment file.

15. The system of claim 14, wherein the third pause segment is of a predetermined duration, wherein the predetermined duration is less than each of a duration of the first pause segment and a duration of the second pause segment.

16. The system of claim 12, wherein the processor is further configured to:
replace the first pause segment and the second pause segment with a third pause segment correspondingly in the audio stream.

17. The system of claim 12, wherein the processor is configured to process the audio stream to identify the first pause segment by:

analyzing a waveform corresponding to the audio stream;
determining a portion of the waveform having a frequency between a predefined frequency range;
assigning the portion to be the first pause segment when a duration of the first pause segment is greater than or equal to a predetermined threshold duration.

18. The system of claim 17, wherein the first audio segment and the second audio segment corresponds to corresponding portions of the waveform each having a frequency outside the predefined frequency range.

19. The system of claim 12, further comprising an output device, wherein the processor is configured to obtain the third audio segment by:
determining the first audio segment as a segment within the audio stream terminating at a start of the first pause segment and beginning either at a start of the audio stream or at an end of a fourth pause segment recorded prior to the first audio segment.

20. A method for editing an audio segment of an audio stream having a plurality of pause segments and a plurality of audio segments, wherein each of the plurality of pause segments include a frequency between a predefined frequency range and each of the plurality of audio segments include a frequency outside the predefined range, the method comprising:
receiving, by a processor, a request to re-record the audio segment, wherein the request includes one or more commands from a user,
identifying, by the processor, the audio segment to be re-recorded, wherein the identification includes:
determining, by the processor, a number of the one or more commands provided by the user,
identifying, by the processor, a pause segment from the plurality of pause segments in the audio stream based on the number of commands, wherein the number of commands indicate a position of the pause segment in the audio stream, and
determining, by the processor, an audio segment beginning at an end of the pause segment and terminating either at an end of the audio stream or at a beginning of another pause segment recorded in succession to the audio segment, as the audio segment to be re-recorded;
obtaining, by the processor, another audio segment including a re-recorded version of the audio segment, wherein obtaining the other audio segment includes automatically issuing, by the processor, a notification to provide the other audio segment upon playing a portion of a first audio segment terminating at a start of the pause segment without user intervention; and
replacing, by the processor, the audio segment with the obtained other audio segment.

* * * * *